United States Patent
Ball et al.

(10) Patent No.: US 9,223,743 B1
(45) Date of Patent: Dec. 29, 2015

(54) MULTIPLIER OPERABLE TO PERFORM A VARIETY OF OPERATIONS

(75) Inventors: James L. Ball, Santa Cruz, CA (US); James R. Lawson, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 842 days.

(21) Appl. No.: 12/753,011

(22) Filed: Apr. 1, 2010

Related U.S. Application Data

(62) Division of application No. 11/441,692, filed on May 26, 2006, now Pat. No. 7,720,901.

(51) Int. Cl.
  G06F 15/04 (2006.01)
  G06F 15/02 (2006.01)
  G06F 1/16 (2006.01)

(52) U.S. Cl.
  CPC .......... *G06F 15/02* (2013.01); *G06F 15/0233* (2013.01)

(58) Field of Classification Search
  None
  See application file for complete search history.

(56) References Cited

U.S. PATENT DOCUMENTS

| | | | |
|---|---|---|---|
| 4,701,860 A * | 10/1987 | Mader | 326/41 |
| 4,716,539 A * | 12/1987 | Mills et al. | 708/503 |
| 5,953,240 A | 9/1999 | Prabhu | |
| 6,154,049 A * | 11/2000 | New | 326/39 |
| 6,651,079 B1 * | 11/2003 | Nguyen et al. | 708/627 |
| 2006/0212505 A1 * | 9/2006 | Islam | 708/620 |

OTHER PUBLICATIONS

Oshashi et al., "The development of a DSP for Speech Signal Processing and Applications", IEEE, 1998, pp. 412-413.
Ball et al., U. S. Application titled "A Multiplier Operable to Perform a Variety of Operations", U.S. Appl. No. 11/441,692, filed May 26, 2006.
Notice of Allowance mailed Jan. 4, 2010, for U.S. Appl. No. 11/441,692.
Allowed Claims for U.S. Appl. No. 11/441,692.

* cited by examiner

*Primary Examiner* — Henry Tsai
*Assistant Examiner* — Dean Phan
(74) *Attorney, Agent, or Firm* — Kwan & Olynick LLP

(57) ABSTRACT

Methods and apparatus are provided for implementing circuitry operable to perform barrel shifting, multiplication, and rotation operations in hard coded logic on a programmable chip. A hard coded multiplier is augmented using multiplexer circuitry, a logical operation, and a bypassable 2^N functional block. Based on control signals, the multiplexer circuitry can be used to select a rotation, multiplication, or barrel shifted output. Multiplexer control signals also provide sign information associated with operands passed to the multiplier. A single augmented multiplier can perform barrel shifting, rotation, or multiplication operations. Inputs of a multiplier can also be selectively grounded to allow the multiplier to perform logic operations.

20 Claims, 8 Drawing Sheets

Figure 4

| Instruction 401 | Src1 Signed 403 | Src2 Signed 405 | Src2 Function 407 | Product Result Mux 409 |
|---|---|---|---|---|
| Shift Or Rotate By Zero 411 | No | No | $2^{src2[4:0]}$ | LSW |
| Shift Left 413 | No | No | $2^{src2[4:0]}$ | LSW |
| Logical Shift Right 415 | No | No | $2^{(32-src2[4:0])}$ | MSW |
| Arithmetic Shift Right 417 | Yes | No | $2^{(32-src2[4:0])}$ | MSW |
| Rotate Left 419 | No | No | $2^{src2[4:0]}$ | LSW Logical OR MSW |
| Rotate Right 421 | No | No | $2^{(32-src2[4:0])}$ | LSW Logical OR MSW |

US 9,223,743 B1

MULTIPLIER OPERABLE TO PERFORM A VARIETY OF OPERATIONS

BACKGROUND OF THE INVENTION

This application is a divisional of and claims priority to U.S. patent application Ser. No. 11/441,692, filed May 26, 2006 and titled "A MULTIPLIER OPERABLE TO PERFORM A VARIETY OF OPERATIONS", the entirety of which is incorporated by reference for all purposes.

BACKGROUND OF THE INVENTION

1. Field of the Invention

The present invention relates to multipliers on programmable chips. In one example, the present invention relates to methods and apparatus for providing a multiplier that can also perform shifting, rotation operations, and other logic operations.

2. Description of Related Art

A variety of hard coded logic blocks are often provided along with configurable logic elements on programmable chips in order to improve programmable chip performance. Processing performed using dedicated hard coded logic is often more efficient than processing performed using soft coded logic. However, provided additional hard coded logic on a programmable chip can lead to added cost, increased waste, and decreased configurability.

For example, a large number of multipliers may be provided in hard coded logic, but a designer may only need a limited number of multipliers. Mechanisms for more efficiently using hard coded logic are limited. Consequently, there are continued efforts to provide devices that overcome at least some of the drawbacks noted above.

SUMMARY OF THE INVENTION

Methods and apparatus are provided for implementing circuitry operable to perform barrel shifting, multiplication, and rotation operations in hard coded logic on a programmable chip. A hard coded multiplier is augmented using multiplexer circuitry, a logical operation, and a bypassable 2^N functional block. Based on control signals, the multiplexer circuitry can be used to select a rotation, multiplication, or barrel shifted output. Multiplexer control signals also provide sign information associated with operands passed to the multiplier. A single augmented multiplier can perform barrel shifting, rotation, or multiplication operations. Inputs of a multiplier can also be selectively grounded to allow the multiplier to perform logic operations.

In one embodiment, a circuit operable to perform multiplication, shifting, and rotation is provided. The circuit includes a multiplier and multiplexer circuitry. The multiplier is implemented using hard-logic on a programmable chip. The multiplier includes a first multiplier input, a second multiplier input, and a multiplier output. The first multiplier input provides a first operand and the second multiplier input provides a second operand. Multiplexer circuitry is connected to the multiplier. The multiplexer circuitry includes a first multiplexer input, a second multiplexer input, a third multiplexer input, and a multiplexer output. The third multiplexer input includes a bitwise OR of the first multiplexer input and the second multiplexer input. The first multiplexer input includes the most significant bits associated with the multiplier output and the second multiplexer input includes the least significant bits associated with the multiplier output.

In another embodiment, a programmable chip is provided. The programmable chip includes multiple programmable logic elements and one or more hard-coded multipliers. The one or more hard-coded multipliers are operable to receive a first operand over multiple first operand input lines and a second operand over multiple second operand input lines and provide a first output over multiple first output lines. A subset of the multiple first operand input lines and a subset of the multiple second input lines are grounded in order for the one or more hard-coded multipliers to provide two-input logic operations on a subset of the output lines.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 4 is a table representation showing selected instructions and selected outputs.

DETAILED DESCRIPTION OF SPECIFIC EMBODIMENTS

Figure 1:
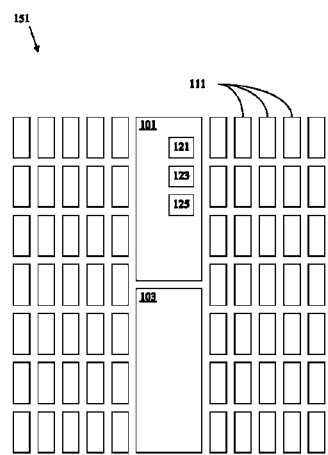
FIG. 1 is a diagrammatic representation of a programmable chip.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable chips, Digital Signal Processing (DSP) blocks, and multipliers. However, it should be noted that the techniques of the present invention can be applied to a variety of devices and logic blocks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

To improve programmable chip performance, a variety of hard coded logic blocks are provided on programmable chips. In some examples, programmable chips have dedicated Digital Signal Processing blocks optimized for DSP applications requiring high data throughput. Combined with soft logic, the DSP blocks allow customization and implementation of various DSP functions efficiently. DSP blocks can be used to implement finite impulse response (FIR) filters, complex FIR filters, fast Fourier transform (FFT) functions, discrete cosine transform (DCT) functions, and correlators. DSP blocks include hard coded multipliers, adders, multiply accumulate (MAC) blocks, multiply-adders, etc. These multipliers, adders, multiply accumulate (MAC) blocks, multiply-adders can also be implemented using soft logic, although performance is improved when the blocks are implemented using hard coded logic.

Although providing hard coded logic can improve programmable chip performance, hard coded logic blocks are often inefficiently used. For example, a designer may require 10 36×36 multipliers in a particular design, but only 8 36×36 multipliers are provided in hard coded logic. Consequently, two multipliers still need to be implemented using soft logic. The two soft logic multipliers may adversely impact performance. In another example, a designer may require only 4 18×18 multipliers, but a device provides 16 18×18 multipliers as hard coded logic. A large number of hard coded multipliers may remain unused. In another example, a designer may require a barrel shifter, but no barrel shifters are provided in hard coded logic. Hard coded logic may be inadequate or underused, and certain logic blocks may require the use of a large amount of soft coded logic to implement.

Consequently, the techniques of the present invention provide an augmented multiplier that can also be flexibly used to perform shifting and rotation operations. By providing multipliers that can be used for multiple purposes, a designer can more likely increase usage of available hard coded logic blocks. Shifting, rotation, and multiplication operations can benefit from performance gains provided by hard coded logic. According to various embodiments, the techniques of the present invention recognize that left shifting by n bits is the same as multiplying by $2^n$ ($2^n$, $2\exp(n)$ or 2 raised to the n power). Left rotating by n bits is the same as left shifting, but with a bitwise OR operation performed on the low and high halves of the multiplier product. Right shift and right rotate operations are performed with a variation of this scheme. A multiplexer connected to the multiplier selects either the low half of the multiplier product, the high half of the multiplier product, or the output of the bitwise OR operation. Circuitry is included to convert one of the inputs into $2^n$ or $2^{(m-n)}$ where m is the length of the input. The $2^n$ circuit can be bypassed depending on the type of operation a designer wants performed.

In another embodiment, it is recognize that multipliers are implemented using a combination of AND gates and adders, which are in turn are typically implemented using AND gates and OR gates. In many implementations, other gate logic can also be used. By grounding many of the inputs to a multiplier such as a 4×4 or a 9×9 multiplier, multiplier inputs can be used to provide gate logic.

FIG. 1 is a diagrammatic representation showing one example of a programmable chip that can use the techniques of the present invention. Any device such as a Field Programmable Gate Array (FPGA) or a Programmable Logic Device (PLD) that is configurable using a hardware descriptor language (HDL) such as Verilog or VHDL is referred to herein as a programmable chip. A programmable chip 151 includes hard coded logic blocks 101 and 103. In some examples, the hard coded logic blocks 101 and 103 are DSP blocks that can efficiently implement multiplication, multiply-accumulate (MAC) and multiply-add functions. In one example, the hard coded logic block 101 includes a multiplier 121, an adder 123, and an accumulator 125. The multipliers can be configured to feed an adder or an accumulator.

According to various embodiments, the DSP block 101 also has input registers that can be configured to operate in a shift register chain for efficient implementation of functions like FIR filters. The programmable chip also includes logic array blocks (LABs), logic cells, or logic elements 111. The programmable chip uses different types of resources that can be interchangeably used in different allocations to implement a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The programmable chip 151 can also include other components such as a hard coded processor or memory. Alternatively, logic elements can also be used to implement soft processors as well as other components such as hardware accelerators, peripheral devices, and peripheral interfaces. Peripheral devices and peripheral interfaces are herein referred to as components. In some embodiments, a system on a programmable chip can be implemented on the programmable chip 151. The programmable chip system components are connected using an interconnection fabric. Any mechanism or logic for connecting components in a system is referred to herein as an interconnection fabric. In one example, the interconnection fabric is a bus. In another example, the interconnection fabric is a slave side arbitration fabric that associates slave components with individual arbiters to allow a first master component to access a first slave component at the same time a second master component is accessing a second slave component.

Figure 2:
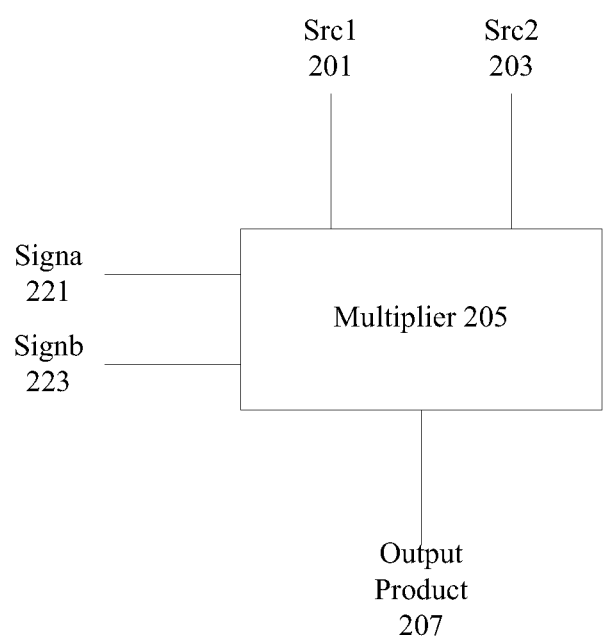
FIG. 2 is a diagrammatic representation showing a multiplier.

FIG. 2 is a diagrammatic representation showing a multiplier associated with hard coded logic such as a hard coded DSP block. According to various embodiments, hundreds of multipliers are provided in a single DSP block. Multipliers included in a single DSP block can include 9×9, 18×18, or 36×36 multipliers as well as multipliers of other sizes. Depending on the data width of the multiplier, a single DSP block can perform many multiplication operations in parallel. According to various embodiments, each multiplier operand can be a unique signed or unsigned number. Control signs associated with a multiplier 205 can be used to provide sign information. In one example, two control signals, signa 221 and signb 223, control the representation of each operand src1 201 and src2 203 respectively. A logic 1 value on the signa signal 221 indicates that operand 201 is a signed number while a logic 0 value indicates an unsigned number.

Table 251 shows the sign of the multiplication result 215 for various operand sign representations. The result 215 of the multiplication is signed if any one of the operands src1 211 or src2 213 is a signed value. In one embodiment, there is only one signa and one signb signal for each DSP block. All of the data A inputs feeding the same DSP block have the same sign representation in this example. Similarly, all of the data B inputs feeding the same DSP block have the same sign representation in this example.

Figure 3:
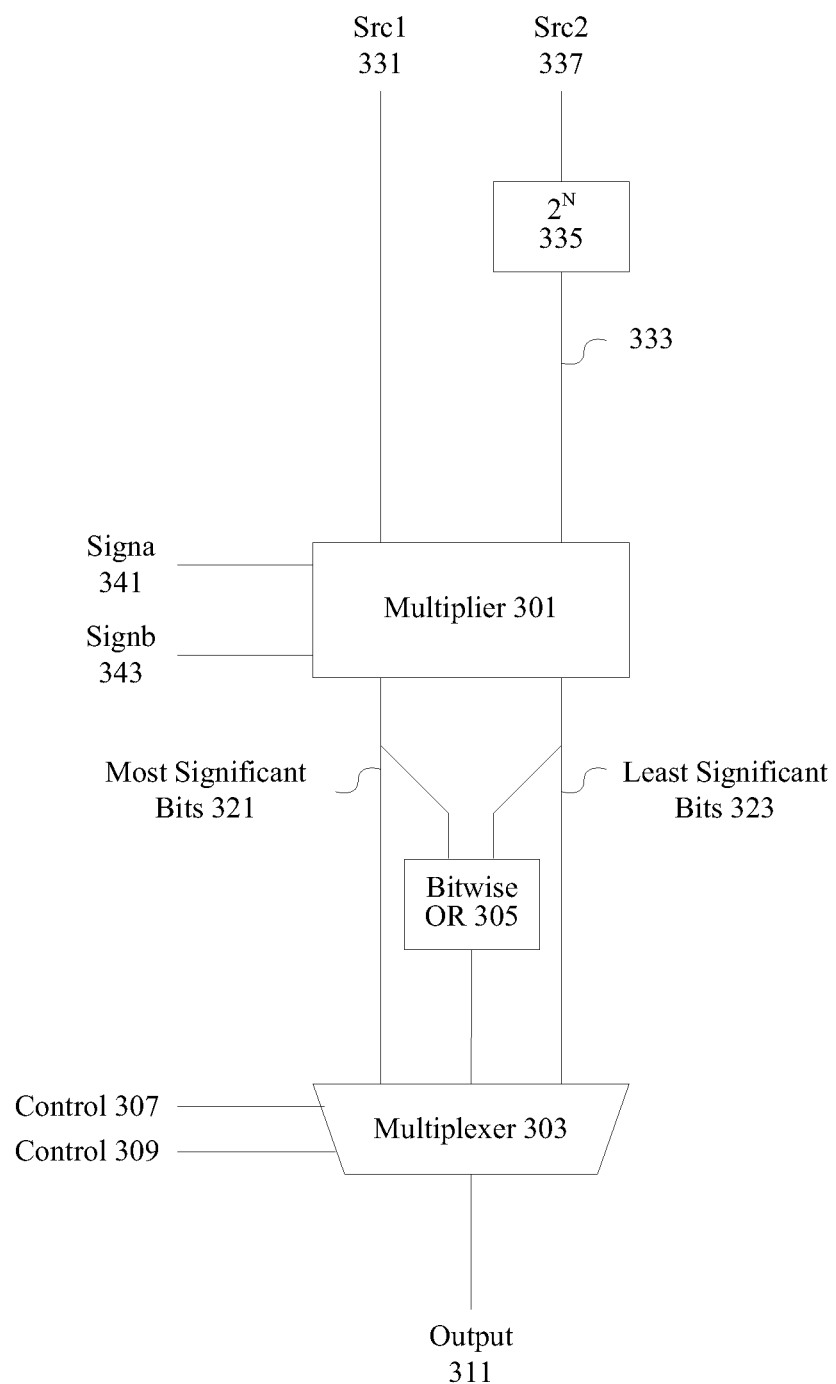
FIG. 3 is a diagrammatic representation showing circuitry operable to perform barrel shifting, multiplication, and rotation operations.

FIG. 3 is a diagrammatic representation showing an augmented multiplier that can also be used to perform shifting and rotation operations. Any circuitry operable to perform multiplication, rotation, and shifting operation is referred to herein as an augmented multiplier. According to various embodiments, a multiplier 301 is enhanced to perform shifts and rotates in addition to multiplication operations by adding a small amount of additional logic. In one embodiment, the additional logic includes one block that optionally performs a 2^N power calculation on one input operand and another that multiplexes the multiplier product result. According to various embodiments, at least the block that multiplexes the multiplier product result is implemented in hard coded logic or at least the block that performs the 2^N calculation is implemented in hard coded logic.

According to various embodiments, an augmented multiplier includes a multiplier 301, a 2^N block 335, and a multiplexer 303. A src1 operand 331 and a src2 operand 337 are provided to the augmented multiplier. A 2^N calculation 335 may be performed depending on the type of operation selected for the augmented multiplier to perform. For example, the 2^N calculation 335 is bypassed is multiplication is performed whereas the 2^N calculation 335 is performed for shifting and rotation operations. The multiplier 301 accepts two input operands 331 and 333 and produces an output result that is provided to the multiplexer 303 through lines 321 and 323. The multiplier also accepts control lines 341 and 343 that indicate whether each of the two input operands 331 and 333 is a signed or unsigned number.

The multiplier provides outputs 321 and 323 to multiplexer 303. The multiplexer takes three inputs. A multiplier that accepts two m-bit inputs produces a 2m-bit product. The first input 321 includes the most significant m bits of the multiplier output. The second input 323 include the least significant m bits of the multiplier output. The third input 325 is the bitwise OR of the first input 323 and the second input 323. In one example, the multiplier provides a 64 bit output. First input 321 includes [63:32] while second input 323 includes [31:0]. Bitwise OR operation 305 provides the bitwise OR of the first input 321 and second input 323 as a third input 325. It should be noted that other logical gates can be used in place of an OR gate, such as NOR and NOT gates. Multiplexer 303 selects one of the inputs 321, 323, and 325 and provides it as the output 311 of the augmented multiplier. The multiplexer 303 selects the appropriate output using control lines 307 and 309. The control lines 307 and 309 can provide information on the type of instruction such as shift left, logical shift right, arithmetic shift right, rotate left, etc. To perform shifts and rotates, the least-significant $\log_2 m$ bits of the src2 operand (the shift amount) are converted to a 2 to the N power value.

In a 32-bit example, the least significant five bits of the src2 operand 337 is converted using the 2 to the N power operation 335 to a 32-bit constant provided on line 333. A 64 bit product result is then calculated by multiplying the constant provided on line 333 with the src1 operand provided on line 331. The most-significant word (MSW) is provided as input 331. The least-significant word (LSW) is provided as input 333. The bitwise OR of the MSW and the LSW is provided as input 335.

FIG. 4 is a table representation showing product result multiplexer selection for a 32-bit example. A variety of other bits widths can be used. Instruction column 401 identifies multiple types of instructions including shift or rotate by zero 411, shift left 413, logical shift right 415, arithmetic shift right 417, rotate left 419, and rotate right 421. Columns 403 and 405 show src1 operand and src2 operand sign values, and column 407 shows the output of the 2 to the N power function. The output selected by the multiplexer is shown in column 409. For example, to perform a rotate left operation 419, an operation 2 to the src2[4:0] power is taken and the output of MSR bitwise OR LSW is provided as the augmented multiplier output.

Although the techniques of the present invention recognize that a multiplier can be provided with additional logic in order to increase multiplier utilization rates on a programmable chip, the techniques of the present invention also recognize selective inputs of a particular multiplier can be grounded to allow a multiplier to provide gate logic.

Figure 5:
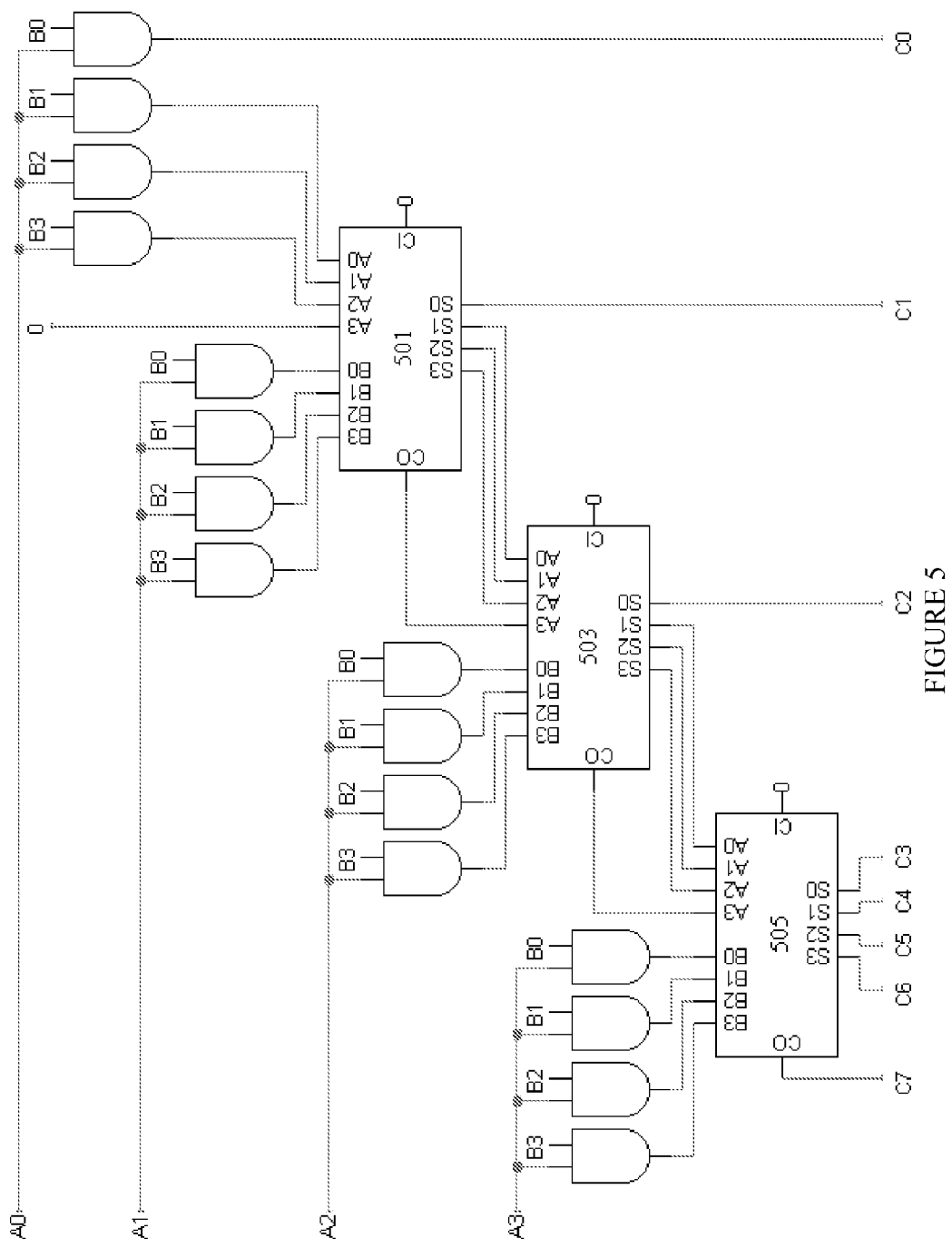
FIG. 5 is a diagrammatic representation showing one example of a 4×4 multiplier implemented using gates.

FIG. 5 is a diagrammatic representation showing one example of a 4×4 multiplier that can be implemented using AND gates and adders. The 4×4 multiplier includes a first input operand including bits A0, A1, A2, and A3 and a second input operand including bits B0, B1, B2, and B3. The multiplier includes AND gates as well as adders 501, 503, and 505. In one embodiment, inputs A1, A3, B1, and B3 are grounded. At key multiplier outputs, we could obtain the following arrangement of 2-input logic:

C0=A0 AND B0;
C2=A0 AND B2+A2 AND B0;
C4=A2 AND B2;

In some examples, a multiplier has programmable inverts. In a 4×4 multiplier, 8 2-input functions are available. Five of the input functions are trivial (0, 1, A, !A, B, and !B). The remaining three represent A AND B with invertible inputs and A XOR B. In some examples, a multiplier has invertible outputs, allowing implementation of complement functions. It is recognized that using a multiplier to implement logic operations is slower than using logic elements or other circuitry. Consequently, non-critical 2-input functions are moved to unused multipliers.

Figure 6:
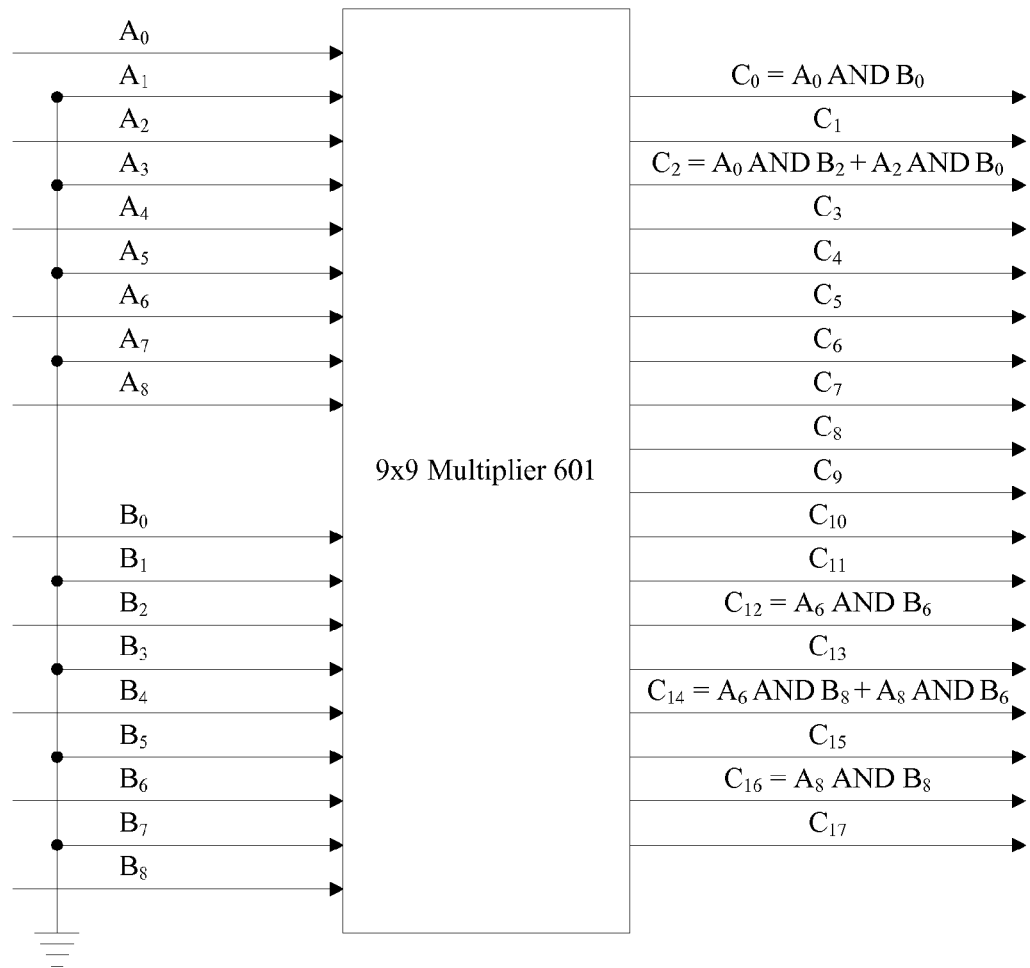
FIG. 6 is a diagrammatic representation showing a 9×9 multiplier having selective inputs.

FIG. 6 is a diagrammatic representation showing one example of a 9×9 multiplier used to implement 2-input logic. The 9×9 multiplier 601 includes first input operand bits A0, A1, A2, A3, A4, A5, A6, A7, and A8 and second input operand bits B0, B1, B2, B3, B4, B5, B6, B7, and B8. The 9×9 multiplier 601 provides output lines C0, C1, C2, C3, C4, C5, C6, C7, C8, C9, C10, C11, C12, C13, C14, C15, C16, and C17. According to various embodiments, the inputs to the multiplier have programmable inverts. Sixteen 2-input logic outputs are provided. Six of the functions are trivial (0, 1, A, !A, B, !B). The remaining are the five following non-trivial functions:

!A AND !B;
A AND !B;
!A AND B;
A AND B;
A XOR B;

The four AND gate results A0B0, A2B2, A6B6 and A8B8 with the programmable inverts can be used to independently implement any of the 6 trivial 2-input functions, as well as 4 of the 5 interesting 2-input functions (not including XOR). A programmable invert at the output would allow implementation of complement functions, leaving just A XOR B, and NOT (A XOR B).

To obtain an XOR output, the following outputs can be used:

A0B2 plus A2B0;

A6B8 plus A8B6;

In one example, C is connected to A0 AND B2, and D is connected to B0 AND A2. This gives A0 AND B2 plus B0 AND A2 on output C2, which provides an XOR function. The same can be applied to output C14, which provides A6 AND B8 plus A8 AND B6. The XOR operations take up twice as many resources as the other 2-input functions. A 9×9 multiplier can be used to provide 4 independent 2-input non-XOR functions, 2 independent 2-input XOR functions, or a combination of 1 XOR with 2 non-XOR functions. Multipliers may also provide registers that can be used to allow additional improvements.

Figure 7:
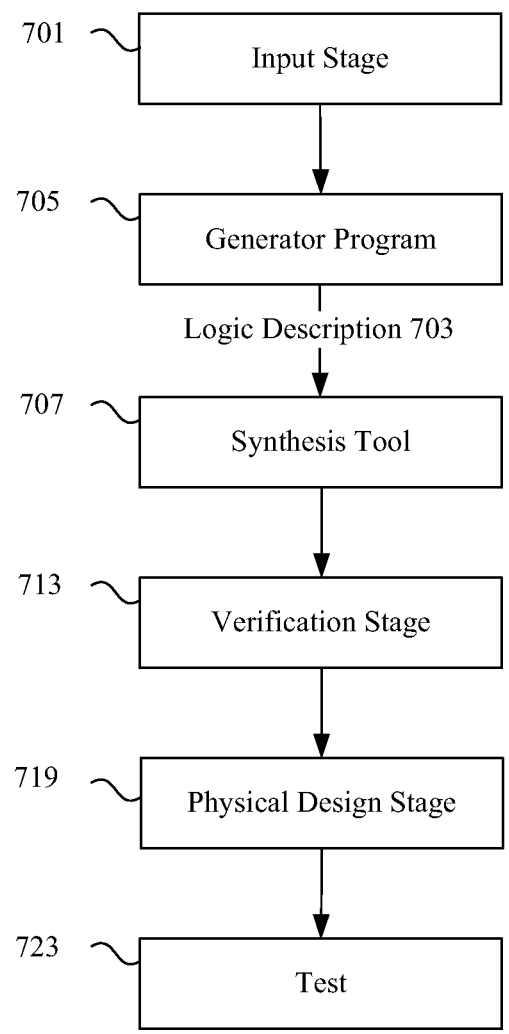
FIG. 7 is a diagrammatic representation showing a technique for implementing the programmable chip.

FIG. 7 is a diagrammatic representation showing implementation of an electronic device that can use according to various embodiments. An input stage 701 receives selection information typically from a user for logic such as a processor core as well as other components to be implemented on an electronic device. In one example, the input received is in the form of a high-level language program. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. The input stage 701 also allows configuration of hard coded logic. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 705 identifies pointers and provides ports for each pointer. One tool with generator program capabilities is System on a Programmable Chip (SOPC) Builder available from Altera Corporation of San Jose, Calif. The generator program 705 also provides information to a synthesis tool 707 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 709.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
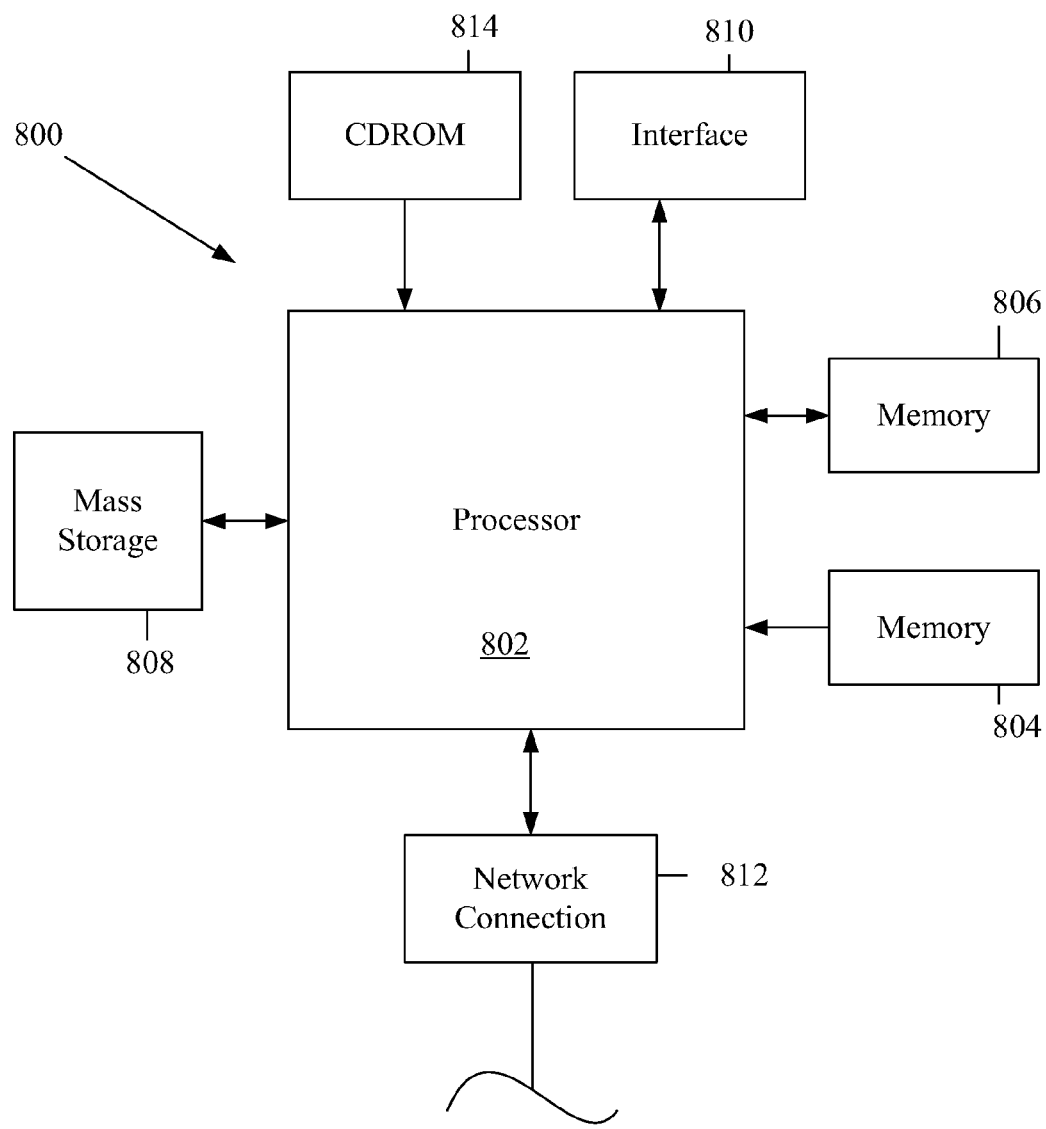
FIG. 8 is a diagrammatic representation depicting a computer system.

FIG. 8 is a diagrammatic representation showing a typical computer system that can be used to implement a programmable chip having bus arbitration with priority encoding and fairness. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the present invention.

What is claimed is:

1. A programmable chip, comprising:
a plurality of programmable logic elements;
a hard-coded multiplier implemented using only AND gates and adders, the hard-coded multiplier configured to receive a first operand over a plurality of first operand input lines and a second operand over a plurality of second operand input lines and to provide a first output over a plurality of first output lines, wherein the plurality of first operand input lines and the plurality of second operand input lines are all inputs to the hard-coded multiplier,
wherein a subset of the plurality of first operand input lines and a subset of the second plurality of input lines are grounded such that the hard-coded multiplier provides only two-input logic operations on a subset of the first plurality of output lines,
wherein the hard-coded multiplier uses hard-coded logic to perform shifting, rotation, and multiplication operations in addition to hard-coded two-input logic operations, and wherein a subset of the plurality of output lines provides a plurality of XOR and non-XOR functions.

2. The programmable chip of claim 1, wherein the multiplier is a 9×9 multiplier.

3. The programmable chip of claim 2, wherein the plurality of first operand input lines includes lines A0, A1, A2, A3, A4, A5, A6, A7, and A8.

4. The programmable chip of claim 3, wherein the subset of the plurality of first operand input lines that are grounded include lines A1, A3, A5, and A7.

5. The programmable chip of claim 4, wherein the plurality of second operand input lines includes lines B0, B1, B2, B3, B4, B5, B6, B7, and B8.

6. The programmable chip of claim 5, wherein the subset of the plurality of second operand input lines that are grounded include lines B1, B3, B5, and B7.

7. The programmable chip of claim 6, wherein the plurality of first output lines includes lines C0, C1, C2, C3, C4, C5, C6, C7, C8, C9, C10, CII, C12, C13, C14, C15, C16, and C17.

8. The programmable chip of claim 7, wherein C0=A0 AND B0, C12=A6 AND B6, and C16=A8 AND B8.

9. The programmable chip of claim 8, wherein C2=A0 AND B2+A2 AND B0 and C14=A6 AND B8+A8 AND B6.

10. A system, comprising:
- a plurality of programmable logic elements;
- a hard-coded multiplier implemented using only AND gates and adders, the hard-coded multiplier configured to receive a first operand over a plurality of first operand input lines and a second operand over a plurality of second operand input lines and to provide a first output over a plurality of first output lines, wherein the plurality of first operand input lines and the plurality of second operand input lines are all inputs to the hard-coded multiplier,
- wherein a subset of the plurality of first operand input lines and a subset of the second plurality of input lines are grounded such that the hard-coded multiplier provides only two-input logic operations on a subset of the first plurality of output lines, and
- wherein the hard-coded multiplier uses hard-coded logic to perform shifting, rotation, and multiplication operations in addition to hard-coded two-input logic operations, and wherein a subset of the plurality of output lines provides a plurality of XOR and non-XOR functions.

11. The system of claim 10, wherein the multiplier is a 9×9 multiplier.

12. The system of claim 11, wherein the plurality of first operand input lines includes lines A0, A1, A2, A3, A4, A5, A6, A7, and A8.

13. The system of claim 12, wherein the subset of the plurality of first operand input lines that are grounded include lines A1, A3, A5, and A7.

14. The system of claim 13, wherein the plurality of second operand input lines includes lines B0, B1, B2, B3, B4, B5, B6, B7, and B8.

15. The system of claim 14, wherein the subset of the plurality of second operand input lines that are grounded include lines B1, B3, B5, and B7.

16. The system of claim 15, wherein the plurality of first output lines includes lines CO, C1, C2, C3, C4, C5, C6, C7, C8, C9, C10, CII, C12, C13, C14, C15, C16, and C17.

17. The system of claim 16, wherein CO=A0 AND B0, C12=A6 AND B6, and C16=A8 AND B8.

18. The system of claim 17, wherein C2=A0 AND B2+A2 AND B0 and C14=A6 AND B8+A8 AND B6.

19. A hard-coded multiplier comprising:
- means to receive a first operand over a plurality of first operand input lines and a second operand over a plurality of second operand input lines, wherein the plurality of first operand input lines and the plurality of second operand input lines are all inputs to the hard-coded multiplier;
- means to provide a first output over a plurality of first output lines, wherein a subset of the plurality of first operand input lines and a subset of the second plurality of input lines are grounded such that the hard-coded multiplier provides only two-input logic operations on a subset of the first plurality of output lines,
- wherein the hard-coded multiplier implemented using only AND gates and adders uses hard-coded logic to perform shifting, rotation, and multiplication operations in addition to hard-coded two-input logic operations, and wherein a subset of the plurality of first output lines provides a plurality of XOR and non-XOR functions.

20. The hard-coded multiplier of claim 19, wherein the multiplier is a 9×9 multiplier.

* * * * *